Aug. 28, 1962  J. H. BORDEN  3,051,267
ELEVATOR CONTROL
Filed Aug. 10, 1959  5 Sheets-Sheet 1
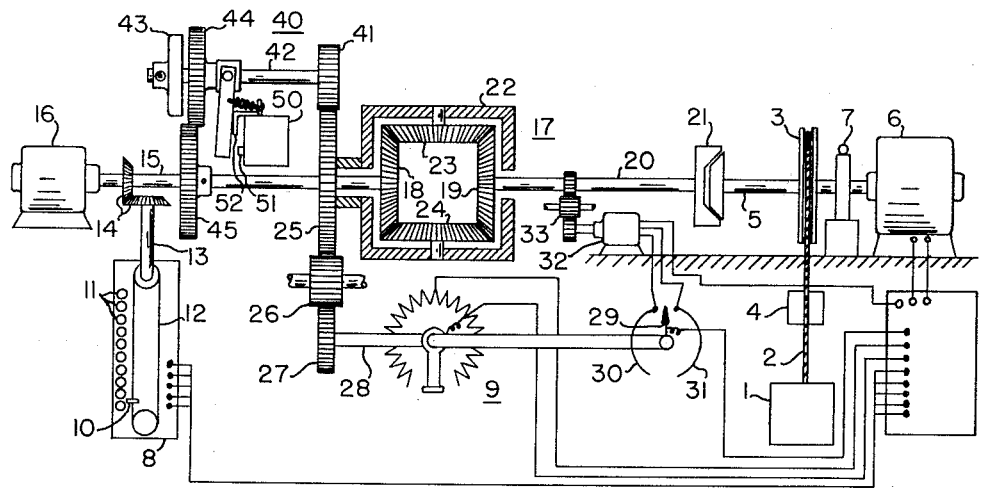
Fig. I
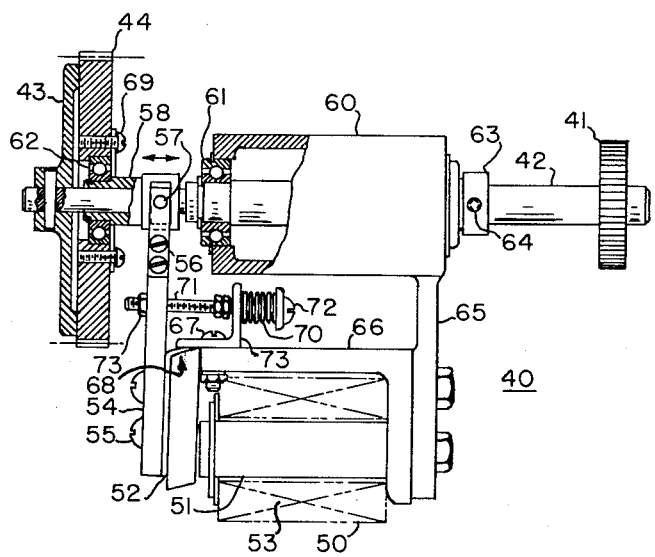
Fig. II
INVENTOR.
JOSEPH H. BORDEN
BY
Marshall, Marshall & Yeasting
ATTORNEYS Aug. 28, 1962  J. H. BORDEN  3,051,267
ELEVATOR CONTROL
Filed Aug. 10, 1959  5 Sheets-Sheet 2
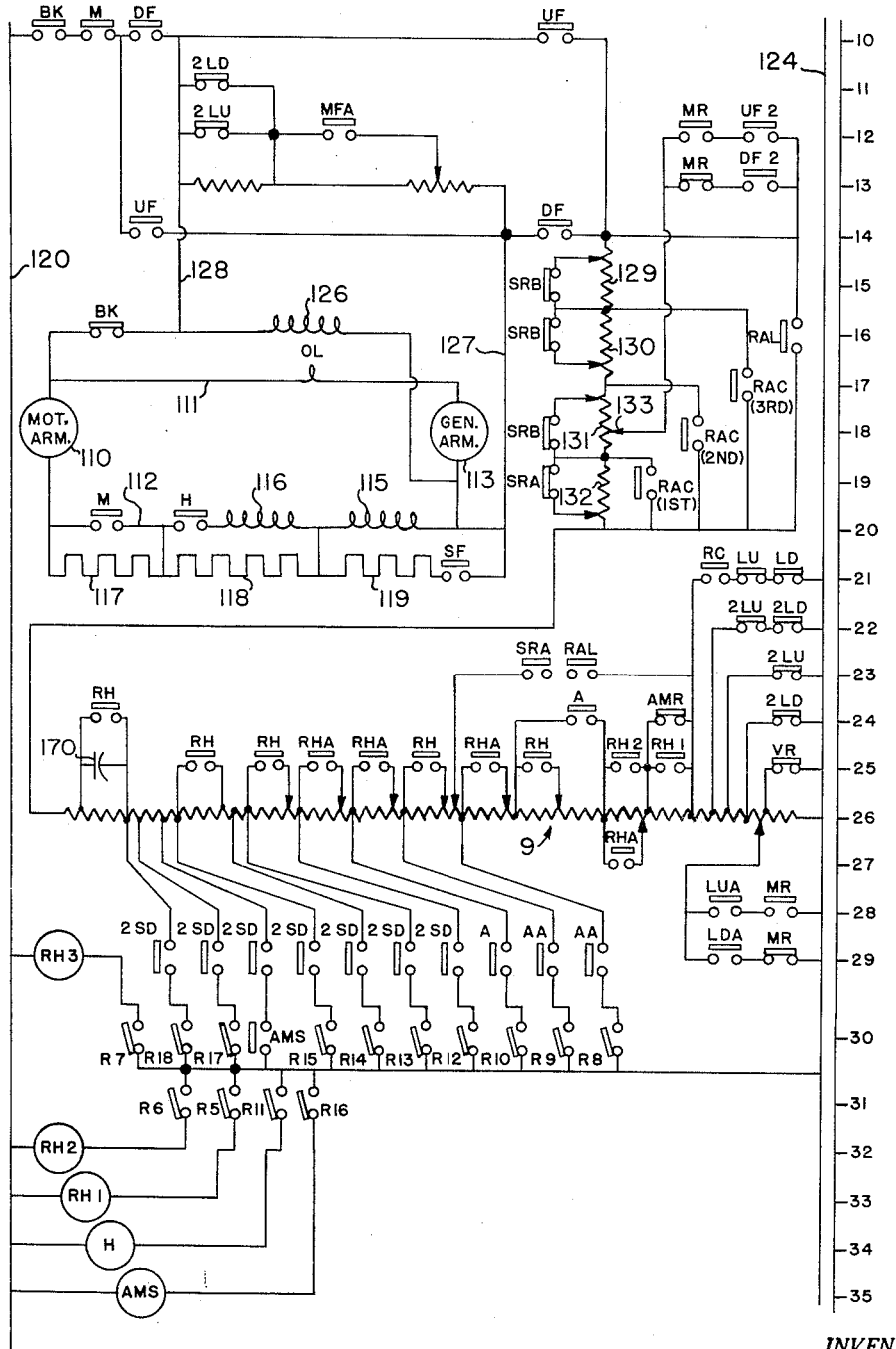
Fig. III
INVENTOR.
JOSEPH H. BORDEN
BY
Marshall, Marshall & Yeasting
ATTORNEYS

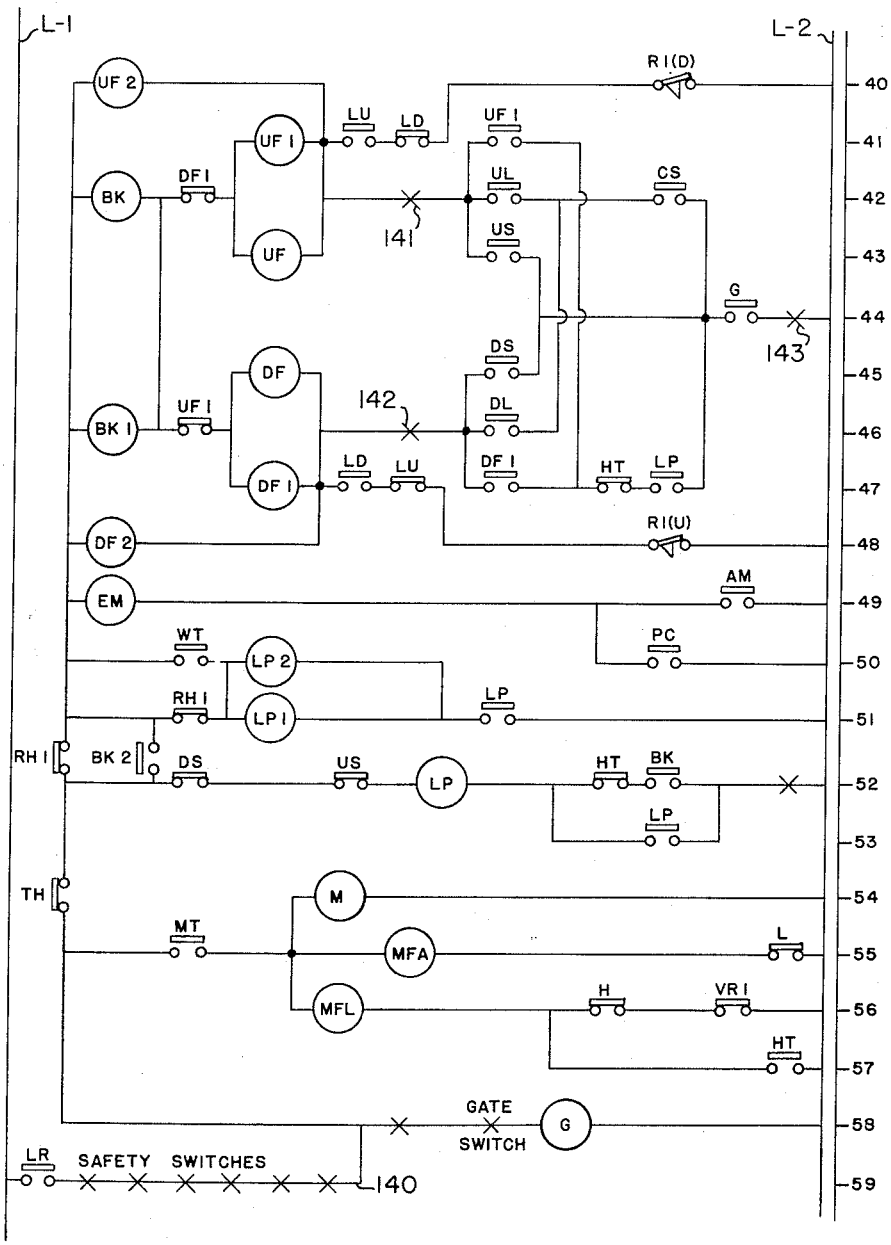
Fig. IV
INVENTOR.
JOSEPH H. BORDEN
BY
Marshall, Marshall & Yeasting
ATTORNEYS

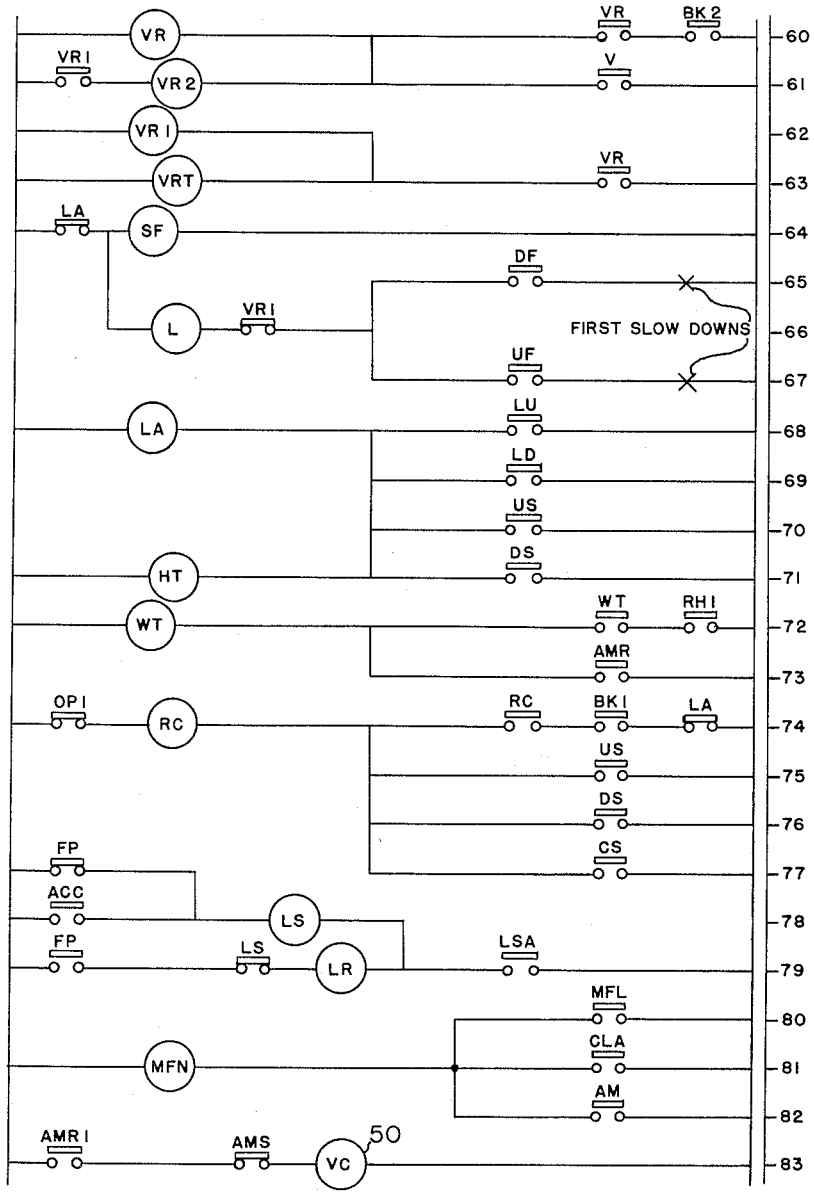
Fig. V

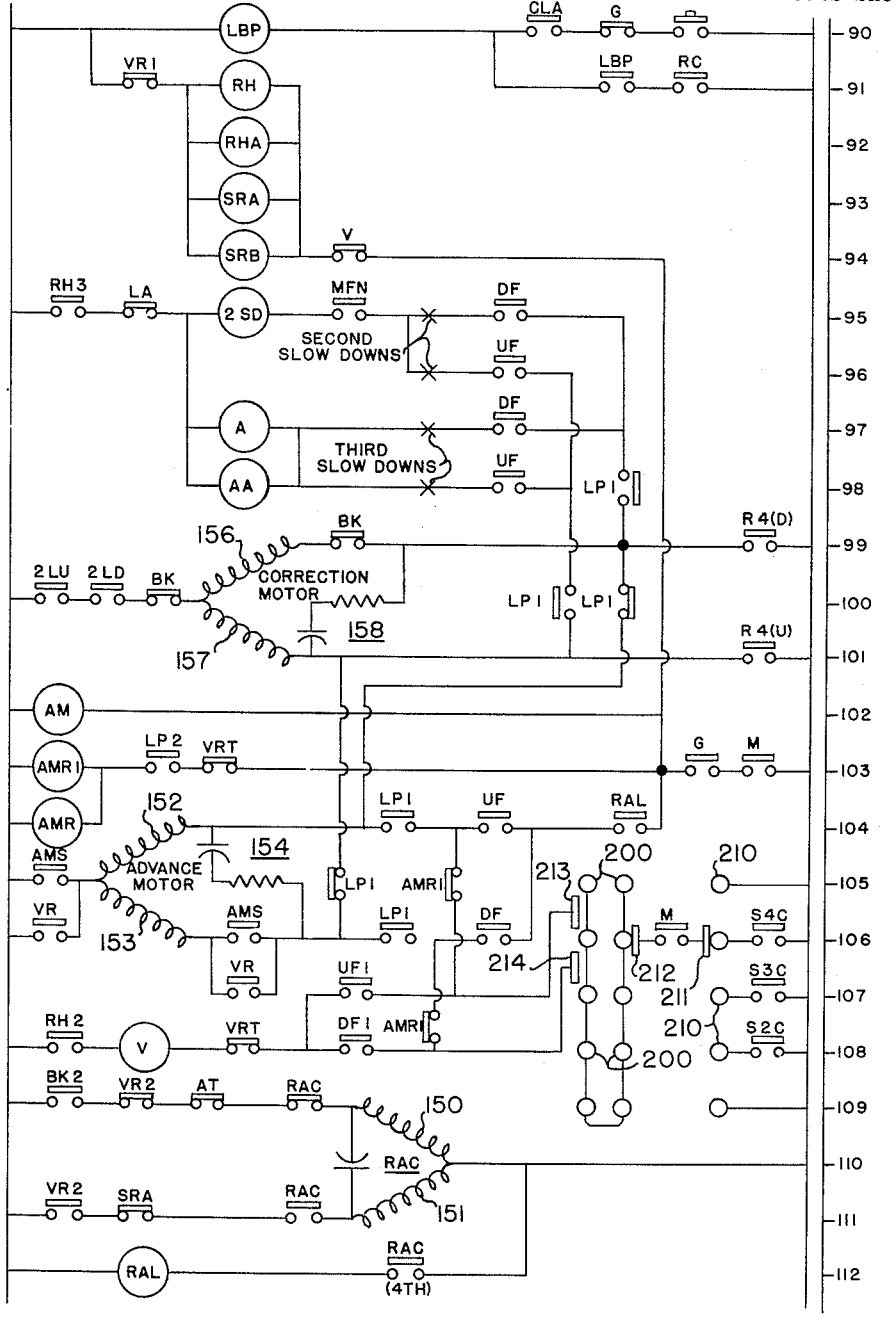
Fig. VI

United States Patent Office 3,051,267
Patented Aug. 28, 1962

3,051,267
ELEVATOR CONTROL
Joseph H. Borden, Toledo, Ohio, assignor to Toledo
Scale Corporation, Toledo, Ohio, a corporation of Ohio
Filed Aug. 10, 1959, Ser. No. 832,576
28 Claims. (Cl. 187—29)

This invention relates to elevator systems in general and more particularly to controls for elevators.

It is an object of this invention to improve elevator systems, to improve elevator service, and to increase the efficiency and speed of response of elevators.

It is a further object of this invention to improve the performance of elevator systems in the short run area, particularly floor to floor speed and runs of distances wherein the elevator car cannot reach full speed through its normal means of acceleration.

In previous applications of elevator controls there have been many attempts to provide means for greater floor to floor or short run speed of an elevator car. These attempts have usually utilized a completely separate set of circuits for one floor or short runs in an attempt to solve the problem. Although the speeds of short runs have been a problem of the past it is expected to be an even greater problem in the future with the exploitation of basement floors for uses other than storage and maintenance. For example, many of the buildings being built today are designing basement floors for parking areas either for tenants of the building or the customers of the tenants of the buildings. Since much of the service of this type would be initially from a basement floor to a first floor or lobby of the building, the use of short run service of the elevator system would be intensified. Without means to increase the speed of the floor to floor or short runs of an elevator system it might be necessary to install an additional number of cars to take care of the extended service requirements. The use of separate circuits for short floor runs is more expensive and provides more maintenance and breakdown problems. Other attempts at solving this problem are equally as expensive and sometimes not as efficient as desired.

A feature of this invention is the integration of a means for obtaining greater floor to floor speed on short runs with the normal accelerating apparatus already in use. In the type of elevator system illustrated in the drawings showing an embodiment of the invention a floor selector mechanism is utilized to present various signals to a motor control of a lifting motor driving a car. These signals include the initiation of a stopping sequence. The floor selector mechanism includes a carriage having a crosshead with individual brushes that is driven past banks of fixed contacts by the advance motor. The advance motor may be a slow speed synchronous motor which is characterized by its instantly rapid acceleration and deceleration. As a part of the motor control a mechanical rheostat is utilized which inserts and removes resistance to control the speed of the lifting motor which is driving an elevator car. This mechanical rheostat is driven by the output of a differential having two inputs which are operatively connected to the advance motor and the lifting motor, respectively. Thus when a car start signal is received the advance motor starts, and is immediately up to full speed. In so doing the advance motor causes the removal of resistance from the mechanically operated rheostat since the lifting motor is standing still or moving very slowly allowing the differential to drive the rheostat to remove resistance. As resistance is removed from the rheostat the lifting motor accelerates and after a predetermined interval the lifting motor will be up to its normal speed.

The advance motor tends to drive the rheostat in a direction to accelerate the elevator lifting motor in a direction to follow the advance motor. Simultaneously the elevator motor as it follows the advance motor tends to drive the rheostat in a direction tending to reduce the speed of the elevator motor. When the speeds of the advance motor and the elevator motor correspond the rheostat stops.

Since the advance motor started at substantially the same time as current is applied to a generator field controlling the speed of the elevator motor the advance motor will drive the crosshead carriage of the floor selector mechanism and by the time the speeds of the two motors correspond the carriage of the floor selector will lead the elevator car by as much as twenty feet of hatchway travel for the car as compared to the banks of contacts on the floor selector machine representing floors. The above system is satisfactory on car runs over a distance of a number of floors. However, since the advance motor is leading the actual car travel in the hatchway, on short runs of one or two floors the advance motor through the selector machine has already detected the hall call or car call, has stopped, and has switched in slow down circuits before the mechanically operated rheostat has had an opportunity to accelerate the lifting motor, and thus before the car is more than three or four feet from the floor it just left.

Theoretically the most efficient operation curve between two stops with respect to distance would be to accelerate the car for half the distance to be traveled and decelerate the car over the last half of the distance. This applies particularly to short runs where full speed of the lifting motor might not be attained. Practically, for the greatest passenger comfort and to allow the initiation of a stopping sequence, there should be a short leveling off or peaking period in the middle of the operational curve. Therefore, a curve having, for example, acceleration 45 percent of the distance, a substantially constant speed or a leveling of the acceleration curve for 10 percent of the distance, and deceleration for 45 percent of the distance to be traveled would combine efficiency with comfort on short runs.

Accordingly, it is a feature of this invention to provide an elevator system in which a car may have substantially equal acceleration and deceleration on short runs, this result being obtained by accelerating the car at slightly less than half of the relative speed of the crosshead carriage of the selector machine shown in the invention. The contacts on the crosshead will pick up the signal that the car is to be stopped, and initiate a stopping sequence, and decelerate the car for the remainder of the trip.

It is a further feature of this invention to provide an elevator control system for an elevator car serving a plurality of floors and an elevator motor adapted to drive the car. Motor speed control means are provided for accelerating the car. Means are provided for detecting the normal uniform velocity of said car comprising a differential having two inputs and an output operatively coupling the elevator motor with an advance motor. The output of the differential is operative to change the resistance of the rheostat to which the motor control means is responsive. Means are further provided for detecting a predetermined ratio of the distance traveled by the car from its last stop to the total distance to be traveled comprising means fixing the relationship of the output with one of the inputs of the differential for a predetermined interval after the car has moved away from a floor and further including means for detecting a stop signal for a car. In addition, means are provided for initiating movement of the car away from the floor comprising a rotary acceleration switch which sequentially removes resistance from the motor control means in response to car start signals.

The above and other objects and features of this invention will be appreciated more fully from the following detailed description when read with reference to the accompanying drawing wherein:

FIG. I is a schematic diagram of an elevator system typical of the type to which this invention is applicable and including a preferred embodiment of the invention;

FIG. II is a more detailed drawing of a clutch and gearing arrangement which is utilized in the apparatus of FIG. I;

FIG. III is an across-the-line wiring diagram showing the elevator lifting motor and the immediate circuits associated therewith to control the speed and direction of same;

FIG. IV is an across-the-line wiring diagram of car directional circuits, brake energizing circuits and other associated circuits;

FIG. V is an across-the-line diagram of a portion of the stopping sequence circuits and other associated circuits; and FIG. VI is an across-the-line wiring diagram of circuit means for initiating car movement away from the floor, a fragmentary car stopping circuit, and circuits associated with the advance motor.

The relays utilized in this invention are shown in across-the-line diagrams. Their contacts therefore are often located remote from the actuating coils. In order to illustrate the relation and location of actuating coils and contacts, a marginal key has been employed with each circuit diagram whereby the circuits are divided into horizontal bands which are identified by line numbers in the right hand margin of the figure. Relay symbols are located in that margin to the right of the key numerals and in horizontal alignment with the relay actuating coil positions. Each contact actuated by a relay coil is designated to the right of the relay symbol by the numeral of its line location. Back contacts, those which are normally closed when the relay armature is dropped out and are opened when the actuating coil is deenergized, are underlined in the key to distinguish them from front contacts, those which are closed upon the coil being energized. Thus, for example, advance motor switch relay AMS has its actuating coil located in line 35 of FIG. III and when energized closes its front contacts in lines 30, 105 and 106 of FIGS. III and VI, respectively, designated in the margin as 30, 105, and 106 and opens its back contacts at line 83 of FIG. V designated in the margin by 83. Each contact is also labeled with the symbol of its actuating means and is illustrated in the condition it assumes while its armature is dropped out so that the front contacts of the advance motor switch relay are shown as open in line 30 and are labeled AMS while the similarly labeled back contacts in line 83 are shown closed.

The following is a list of the relays utilized in the circuitry of this invention identifying the relays by their symbol, their name, and the line of the across-the-line wiring diagrams in which their actuating coils appear:

| Symbol | Name | Line |
|---|---|---|
| A | Acceleration Relay | 97 |
| AA | do | 98 |
| AM | Auxiliary Main Switch | 102 |
| AMR | Advance Motor Auxiliary Relay | 104 |
| AMR1 | do | 103 |
| AMS | Advance Motor Switch | 35 |
| BK | Brake Relay | 42 |
| BK1 | do | 46 |
| DF | Down Generator Field Relay | 45 |
| DF1 | do | 47 |
| DF2 | do | 48 |
| EM | Emergency Relay | 49 |
| G | Gate Relay | 58 |
| H | High Series Field Switch | 34 |
| HT | Switch Time Relay | 71 |
| L | Limit Relay | 66 |
| LA | Leveling Acceleration Relay | 68 |
| LBP | Load By-Pass Relay | 90 |
| LP | Protective Relay | 52 |
| LP1 | do | 51 |
| LP2 | do | 50 |
| LR | M-G Set Run Switch | 79 |
| LS | M-G Set Start Switch | 78 |
| M | Motor Relay | 54 |
| MFA | Motor Field Strengthening Relay | 55 |
| MFL | Leveling Speed Motor Field Relay | 56 |
| MFN | Normal Motor Field Relay | 81 |
| RC | Retiring Cam Relay | 74 |
| RAC | Rotary Acceleration Switch | 110 |
| RAL | Rotary Acceleration Relay | 112 |
| RH | Rheostat Relay | 91 |
| RHA | do | 92 |
| RH1 | do | 33 |
| RH2 | do | 32 |
| RH3 | do | 29 |
| SF | Low Speed Series Field Switch | 64 |
| SRA | Pattern Control Relays | 93 |
| SRB | do | 94 |
| UF | Up Generator Field Relay | 43 |
| UF1 | do | 41 |
| UF2 | do | 40 |
| V | Advance Motor Stopping Relay | 108 |
| VC | Vernier Clutch Relay | 83 |
| VR | Advance Motor Stopping Relay | 60 |
| VRT | do | 63 |
| VR1 | do | 62 |
| VR2 | do | 61 |
| WT | Rheostat Sequence Relay | 72 |
| 2SD | Second Slowdown Relay | 95 |

In the simplified elevator control system shown in FIGURE I, an elevator car 1 is supported by a cable 2 trained over a drive pulley 3 and attached to a counterweight 4. The drive pulley 3 is mounted on an armature shaft 5 of a slow-speed direct-current elevator motor 6. A brake assembly 7 mounted adjacent the motor 6 is released when the motor is energized and is spring set when the motor is de-energized to prevent coasting of the elevator car 1.

The elevator motor 6 is controlled according to signals transmitted from a floor selector mechanism 8 and a speed control rheostat assembly 9. The signals to initiate the starting and stopping of the drive motor 6 originate from the floor selector mechanism 8 as the operator or passengers register their calls, while the acceleration, deceleration, and constant speed running of the motor 6 is controlled by the rheostat 9.

In the control system illustrated in FIGURE I the floor selector mechanism 8 includes a carriage 10 that is supported and driven past banks of fixed contacts 11, each represented by a single contact, by a chain drive 12. The chain 12 is driven by a shaft 13, gearing 14 and a shaft 15 connected to a reversible constant speed advance motor 16. The advance motor 16 is preferably a slow-speed synchronous inductor motor having a full speed of approximately 75 revolutions per minute. This type of motor is characterized by its extremely rapid acceleration and deceleration. The motor 16, which is driven by alternating current, reaches full speed within one cycle of the alternating current from the time it is energized and stops just as quickly when it is de-energized. The gear ratio through the gearing 14 and the chain drive 12 to the carriage 10 is such that the carriage 10 moves from one bank of contacts 11 to the next in the same time that the elevator car moves from one floor to the next when the car is traveling at its normal running speed.

Circuits are shown hereinafter to energize the advance motor 16 when it is desired to operate the elevator from one floor to another. In addition, a circuit arrangement will be shown where the floor selector mechanism 8 includes a contact arrangement that continues to energize the advance motor 16 in one direction or the other until the carriage 10 is accurately centered with respect to the bank of contacts 11 representing the floor at which the car is to be stopped.

The acceleration, running speed and deceleration of the elevator drive motor 6 is controlled by the rheostat assembly 9. The rheostat 9, driven through a differential gear assembly 17, is jointly under the control of the advance motor 16 and the elevator drive motor 6. The advance motor 16 tends to drive the rheostat 9 in a direction to accelerate the elevator motor 6 in a direction to follow the advance motor 16. Simultaneously the elevator motor 6, as it follows the advance motor 16, tends to drive the rheostat 9 in a direction tending to reduce the speed of the elevator motor 6. When the speeds of the advance motor and the elevator motor correspond the rheostat stops. Therefore, the differential is a means of detecting the normal uniform velocity of the car with a predetermined load.

The differential gear assembly 17 comprises a first input element or gear 18 connected to the shaft 15 driven by the advance motor 16, a second input gear 19 carried on a shaft 20 which is connected through friction clutch 21 to the armature shaft 5 of the elevator drive motor 6, a carrier 22 including gears 23 and 24 meshing with the input gears 18 and 19, and a carrier supported output gear 25 which through an idler 26 drives a gear 27 fixed on a shaft 28 of the rheostat assembly 9.

In this arrangement, the advance motor 16 operating in response to floor selector control circuits drives the floor selector carriage 10 towards the selected floor and at the same time, through the differential gear mechanism 17 turns the rheostat shaft 28 in a direction to start and accelerate the elevator motor 6. The rheostat continues to turn until the speed of the shaft 20 connected to the elevator drive motor 6 corresponds to and is opposite in direction to the speed of the advance motor shaft 15. When these speeds become equal the differential carrier 22 and the rheostat stops and the elevator drive motor runs at constant speed. At this time the elevator car 1 lags behind a position corresponding to the position of the floor selector carriage 10 by an amount determined by the gear ratio and the movement of the rheostat 9 required to bring the elevator motor 6 up to speed. This lag is made generally proportional to the operating speed of the elevator and may be as great as twenty feet for an elevator operating at 800 feet per minute.

When the floor selector carrier 10 reaches the bank of contacts 11 corresponding to the floor at which a stop is to be made the advance motor 16 is de-energized, instantly stops, and thereafter maintains the floor selector mechanism in a position corresponding to that floor. At this instant of stopping of the advance motor 16 the elevator car 1 may be as much as two floors away from the floor at which it is to stop and is moving at full speed. The stoppage of the advance motor 16 stops the input gear 18 of the differential assembly 17 so that the elevator drive motor 6, driving through the second input gear 19, rotates the differential carrier 22 and with it the rheostat 9 toward the slow or zero speed setting. As the rheostat returns toward its center or zero speed setting the speed of the elevator drive motor 6 is correspondingly reduced. As the car approaches within a few feet of the floor at which it is to stop, leveling switches mounted on the car and cooperating with inductor plates or cams in the hatchway, signal the exact position of the car and take over the control of the elevator motor 6 so as to bring the car 1 to a stop, level with the floor, regardless of any creepage that may have occurred between the support cable 2 and the pulley 3 or any stretch in the cable 2 because of load in the elevator car 1. If it should happen because of creepage or stretch that the rheostat 9 does not return precisely to zero when the car is level at a floor auxiliary control circuits including a rotating contact arm 29 on the rheostat shaft 28 cooperating with fixed contacts 30 or 31 energize a correction motor 32 which through gearing 33 is connected to the input shaft 20 intermediate the clutch 21 and the second input gear 19 of the differential. The motor 32, energized through one or the other of the contacts 30 or 31, develops sufficient torque to slip the clutch 21 and to drive the shaft 20 in a direction to return the rheostat assembly 9 to its center position. The required slipping of the clutch 21 corresponds to and corrects for the creepage and stretch of the cable 2 and thus maintains synchronism between the car position and the control mechanism position.

In FIGURE I the control mechanism is shown schematically and while the differential gear mechanism is shown as connected directly on the shafts of the elevator motors and advance motors it is to be understood that in actual construction gearing or other mechanical drive means may be interposed between the motor and the differential gear mechanism and that other forms of differential gear mechanism may be substituted for the bevel gear differential schematically illustrated in the figures.

One of the problems involved in any elevator installation is to design the equipment for long life and simple maintenance. Since the rheostat assembly 9 as illustrated in FIGURE I is operated from center to nearly its complete range of movement in one direction or the other for every start and stop of the elevator the ordinary sliding contact rheostat such as is ordinarily used in the control of the direct current motors has too short a life to be satisfactory. Thus, the rheostat assembly may be constructed, as illustrated in U.S. Patent No. 2,685,348, entitled Elevator Control System, filed Feb. 27, 1952, by substituting a plurality of cam operated switches for the usual sliding contacts. The resultant schematic of such a rheostat is illustrated in FIG. III designated generally at 9.

The electrical controls for an elevator system, particularly of the automatic type, are quite complicated. Because the invention relates primarily to the mechanism and circuits for facilitating the operation of elevator cars on short runs of one floor or more only those portions of the complete circuits which are related to motor control are illustrated in the drawings. The circuits having to do with floor selection, registering of calls, operation of the elevator doors and many other features have been omitted from these drawings.

Referring to FIG. III there is shown an elevator control system including a direct current motor which is connected to the hoisting mechanism that has its armature 110, shown in line 18, connected through leads 111 and 112 to an armature 113 of a variable voltage direct current generator. The armatures 110 and 113 together with the leads 111 and 112 constitute a loop circuit that includes an OL coil of an overload relay arranged to shut down the system should an overload current occur, and generator series field windings 115 and 116 that are wound to be cumulative compound with respect to a shunt field 126 of the generator. The loop circuit also includes normally open contacts M, of a motor relay, in series with contacts H of a high speed series field relay. The motor relay contacts M are by-passed with a resistor 117 so that the circuit is never completely open. The high speed series field contacts H and series field 116 are by-passed with a resistor 118. The low speed series field 115 is by-passed by a resistor 119 and low speed series field contacts SF.

During stand-by operation, the opening of the motor relay contacts M inserts the resistor 117 into the loop circuit to reduce the circulating current through this circuit. This resistor 117 is shorted out of the circuit as soon as the motor is called upon to perform any work. The resistance of the loop circuit is also increased during low speed operation by the opening of the contacts H to disconnect the high speed series field 116 leaving its shunt resistance 118 in the loop circuit. The series field 115 is adjusted to provide the proper compounding for low speed operation. The contacts SF in line 21 open during the leveling operation of the car. The series field 116 is adjusted by varying the number of turns included in the circuit to secure proper compounding for high speed motor operation.

Field excitation for the D.C. motor is provided by current flow from a positive lead 120 through the coil of a field protection relay (not shown) and a shunt field winding (not shown) of the elevator motor to a return lead 124. Two resistors are usually included in this circuit to reduce the field current during stand-by operation, as when the car is standing at a floor. For normal excitation of the field, which is required for medium or high speed operation, one of these resistors is shorted out by contacts MFN of a normal motor field relay MFN at line 83 of FIG. V that is energized as long as the motor is called upon to operate. An increased field strength for leveling speed operation is provided by shorting out both of the resistors by means of contacts MFL of a leveling speed motor field relay MFL at line 56 of FIG. IV. Thus the motor shunt field is at least partially excited at all times that the system is in operation.

The variable voltage generator 113 has a shunt field 126 in line 16 that, for up operation of the car, is energized from the leads 120 and 124 by way of a circuit that may be traced from the lead 120 at line 10 through normally open contacts M of the motor relay M and contacts BK of a brake relay BK, up field relay contacts UF in line 14, a lead 127, the shunt field 126, lead 128, a second set of up field contacts UF shown in line 10 and a series of resistors 129 to 132 inclusive, the latter being connected to the return lead 124 through resistance of the cam operated rheostat designated generally at 9. For operation in the opposite direction the up relay contacts UF are opened and the down field relay contacts DF are closed at lines 10 and 14 to reverse the connections to the generator shunt field 126 at leads 127 and 128. The excitation of the generator shunt field 126 is controlled by the number and resistance of the series resistors 129 to 132 inclusive that are included in series with the field winding and the resistance that is inserted or removed by the rheostat 9.

The cam operated rheostat 9 shown schematically in FIG. III is controlled as to the amount of resistance it inserts or removes from the circuit including the generator shunt field 126 by the cam operated contacts R5 through R18 in lines 30 and 31 plus the second slow-down relay contacts 2SD and acceleration relay contacts A, AA and AAA in line 29. The rheostat also has cam operated contacts R4(D) and R4(U) in lines 99 and 101 and contacts R1(D) and R1(U) in lines 40 and 48. The cams operate to close the contacts R4 through R18 in an order denoted by their R number. That is, R4 closes first, R5 closes second, R6 closes third, etc. The contacts R4 through R18 are opened in the reverse order. That is, R18 opens first, R17 opens second, R16 opens third, etc. The R1(D) and R1(U) contacts are normally closed when the cam operated rheostat 9 is centered and are utilized in cooperation with the leveling circuits to relevel the car after it has been leveled at the floor. Either the R1(U) or R1(D) contacts open, depending upon the direction of car travel, as the car moves away from the floor at a predetermined time after the R4(U) or R4(D) contacts, respectively, close. The resistance of the rheostat 9 may be further modified by the contacts in lines 21 and 25 as will be explained hereinafter.

The sequence of operation of the field control as a car moves away from a floor in an upward direction is as follows. Assuming that all of the safety switches appearing in lead 140 at line 59 of FIG. IV are closed current may flow through the thermal overload switch contacts TH at line 54, the rheostat relay contacts RH1 at line 52, the paralleled brake relays BK and BK1 at lines 42 and 46, the closed down generator field relay contacts DF1, the closed stop limit switch 141, the closed up signal direction relay contacts UL, the closed car starting relay contacts CS at line 42, and the closed gate relay contacts G and landing switch 143 at line 44 to return lead L-2.

The normally closed down field generator relay contacts DF1 at line 42 and the up field generator relay contacts UF1 at line 46 make the down and up field generator relay circuits mutually exclusive. That is, only one of the up or down field generator relay circuits may be energized at a time. The limit switches 141 and 142 open only when the car is a predetermined distance from its travel limit, e.g. six inches from the top or bottom of its travel limits. The CS contacts are closed in response to a signal to start the car. The gate contacts G and landing switch 143 close only after the gate and landing doors are closed. If the gate contacts G and the landing switches are closed the car may be started in response to the closure of the US or DS relay contacts at lines 43 and 45. The US and DS relays are energized by inspection circuits.

When the up field generator relay UF1 is energized it closes contacts UF1 in line 41 sealing in the UF and UF1 relays in a circuit through the switch time relay contacts HT and the protective relay contacts LP at line 47. The HT relay at line 71 is energized by closure of either of the leveling relay contacts LU or LD at lines 68 and 69 and also the previously described inspection relay contacts US or DS at lines 70 and 71. The protective relay contacts LP are closed since the LP relay at line 52 is energized through the inspection series relays back contacts DS and US, the closed switch time relay HT back contacts, and the now-closed brake relay BK contacts. Thus, the UF1 relay is held sealed in until the car is out of the leveling zone.

When the brake relay BK was energized it closed contacts to energize a brake relay BK2 (not shown). Closed BK2 contacts now shunt the RH1 contacts at line 52. The closure of brake relay contacts BK at line 10 and UF contacts at lines 10 and 14 completes the circuit to apply current to the generator shunt field 126 at line 16 in FIG. III. The motor relay contact M at line 10 is energized through the closed MT contacts. The MT relay (not shown) is energized by the same circuit that energizes the brake relay BK2 as described above.

In previous applications of elevator controls as illustrated in FIG. I the use of the advance motor was as follows. The advance motor was energized through gate relay G contacts and motor relay M contacts by the closure of either up generator field contacts UF or down generator field contacts DF depending upon which direction the car was to travel. So the advance motor started at substantially the same time as current is applied to the generator field. Since the advance motor is at full speed at the end of one cycle of its alternating power supply the advance motor will lead the elevator car by as much as 20 feet of hatchway travel as was indicated in the discussion above. The rheostat 9, had its cams operated by the action of the advance motor moving at full speed and the initially slow moving elevator lift motor. The rheostat 9, as described, removed resistance from the motor control circuit until the lifting motor is accelerated to a speed equal to the advance motor. The lifting motor and the advance motor stay at this equal speed until the carriage on the selector machine as driven by the advance motor detects a hall call, etc., and slow down operations are started.

This is quite satisfactory on car runs over a distance of a number of floors. However, for short runs of one or two floors the advance motor through the selector machine has already detected the hall call, etc., has stopped, and has switched in slowdown circuits before the cam operated rheostat has had an opportunity to accelerate the lifting motor, and thus before the car is more than three or four feet from the floor it just left. Theoretically, the most efficient operation curve between two stops with respect to distance would be to accelerate the car for half of the distance to be traveled and decelerate the car over the last half of the distance. This applies particularly to short runs where full speed of the lifting motor might not be attained. Practically, for the greatest passenger comfort and to allow the initiation of a stopping sequence, there should be a short leveling off or peaking period in the middle of the above-described curve. Therefore, a curve having, for example, acceleration forty-five percent of the distance, a substantially constant speed or a leveling off period for ten percent of the distance, and deceleration for forty-five percent of the distance to be traveled would combine efficiency with comfort on short runs.

To obtain the substantially equal acceleration and deceleration the car may be accelerated at slightly less than half of the relative speed of the crosshead on the selector machine. Then the contacts on the crosshead will pick up the signal that the car is to be stopped and initiate the stopping sequence, e.g. decelerate the car over the remainder of the trip.

This result has been achieved in a preferred embodiment of the invention as illustrated in the drawings by utilizing a clutch and gearing arrangement designated generally at 40, schematically in FIG. I and in greater detail in FIG. II. A gear 41 keyed to a shaft 42 is meshed with the output gear 25 of the differential 17. A clutch member 43 is also keyed to the shaft 42. A connecting gear 44 is rotatably mounted on the shaft 42 on the ball bearings 62. A supporting member 60 is also rotatably mounted on the shaft 42 on two pairs of ball bearings, one of which is shown at 61. A vernier clutch solenoid 50 is supported from the member 61 by a bracket 65. The solenoid 50 comprises a core 51 having inductively disposed thereon windings 53 and having connected to the housing thereof an armature 52. The armature 52 may be of the leaf spring variety or it may be pivotally mounted in any manner well known to those skilled in the art. The armature 52 in FIG. II is shown connected to the housing 66 of the solenoid 50 by a nut and bolt arrangement at 67. As may be seen from the drawings in FIG. II, whenever the coil 53 of the solenoid 50 is energized the core 51 will magnetically attract the armature 52 causing the armature 52 to pivot in the area 68 along the spring comprising the armature 52. The armature 52 is connected at 55 to a tongue and yoke arrangement 54, 56. The yoke portion 56 of the tongue-yoke combination is pivotally mounted at 57 on what may be an extension 58 of the gear 44 or which may be an additional plate that is connected to the gear 44 by the screws 69. A retracting spring 70 is journalled on a bolt 71 between the head of the bolt 72 and a bracket 73 which is connected or attached to the housing 66 of the solenoid 50 by the nut and bolt arrangement 67. The bolt 71 extends through the tongue 54 of the tongue-yoke combination 54, 56, and has a retainer nut 73 attached to the bolt 71 on the portion of the bolt 71 that extends through the tongue member 54. Thus, it can be seen that the spring 70, which is precompressed, will push the head of the bolt 72 to the right in the drawing and in so doing, because of the retainer nut 73 on the bolt 71, will also tend to move the tongue-yoke member to the right above a pivot point 68 of the leaf spring 52. The action of the retraction spring 70 will therefore disengage the gear 44 from the clutch member 43. The clutch member 43 may be of aluminum and have a clutch face of suitable material to engage and turn the gear 44 when the gear 44 is brought in contact with the clutch member 43. The gear 44 may be made of plastic impregnated canvas-cloth or other suitable material.

In operation when the vernier clutch solenoid 50 is energized the armature 52 is attracted by the coil 51 and moves the gear 44 into engagement with the clutch member 43. The supporting member 60 is held in its position by a stop member 63 which is fixed to the shaft 42 by a key or set screw 64. When the solenoid 50 is deenergized the magnetic attraction pulling the armature 52 toward the core 51 ceases and the retraction spring 70 bears against the head of the bolt 72 and pulls the gear 44 out of engagement with the clutch 43 by the action of the retainer nut 73 on the tongue member 54.

Referring again to FIG. I it will be seen that the clutch and gearing arrangement 40 fixes the relationship of the output gear 25 of the differential 17 to the shaft 15 when the solenoid 50 is energized. Therefore, the operation of the rheostat 9 has a fixed relationship with the rotation of the shaft 15. Further, if the shaft 15 and the output gear 25 of the differential 17 now have a fixed relationship the input shaft 20 to the differential 17 and thus the shaft 5 through the clutch 21 also having a fixed relationship to the shaft 15 and the output gear 25 of the differential 17. Now, if the lifting motor 6 is accelerated by the motor control circuits while the advance motor 16 is not energized, the rheostat 9 will furnish acceleration to the lifting motor 6, which movement will also be imparted to the crosshead 10 of selector machine 8 through the gearing 14 at a fixed relationship. If the gearing ratio as just described between the shaft 5 of the lifting motor 6 and the movement of the crosshead 10 on the selector machine 8 is fixed at slightly less than a 1:2 ratio the crosshead 10 of the selector machine 8 will be driven past the lanes of floor contacts on the selector machine 8 slightly more than twice as fast as the elevator car 1 is traversing the distance between the floors in the hatchway. A choice of gearing as just described will allow the lifting motor to be accelerated by the rheostat 9 through approximately 45 percent of its trip distance, or slightly less than half, before the crosshead 10 makes contact with the energized contacts 11 at the destination floor. When the crosshead 10 does make contact with the energized contacts 11 the inversion point on the acceleration curve is anticipated and the stopping sequence for the car 1 and the motor 6 is initiated allowing the care 1 to terminate its acceleration at 50 percent of its trip travel and start to decelerate as controlled by the appropriate circuitry.

The circuitry to accomplish the just-described effects is illustrated in FIGS. III through VI. The vernier clutch relay coil 50, designated by the reference letters VC, is shown at line 83 of FIG. V. To prevent the clutch being engaged when the advance motor 16 is running an advance motor starting relay back contact AMS is included in series therewith. The vernier clutch coil is energized when the AMS back contacts are closed through the advance motor auxiliary relay AMR1 contacts at line 83. The advance motor auxiliary relay AMR1 is energized at line 103 of FIG. VI through closed protective relay contacts LP2, advance motor stopping relay back contacts VRT, a gate relay contact G and a motor relay contact M. The advance motor stopping relay VRT is energized only during the stopping sequence when a car approaches a floor. Therefore, proceeding with our example as hereinbefore described of the sequence of operation as a car moves upward from a floor, the gate must be closed so the gate contacts G are closed, the motor must be energized so the motor relay M contacts are closed. Therefore, the energization of the AMR1 relay is dependent on the closure of the protective relay contacts LP2. The protective series relays LP1 and LP2 at lines 50 and 51 are energized through the back contacts of the rheostat relay RH1 and the front contacts of the protective relay LP which are already closed in the sequence described hereinbefore. The rheostat sequence relay contacts WT in parallel with the rheostat relay back contacts at line 51 are also closed since the WT relay in line 72 has been energized through the AMR contacts at line 73. Thus, the vernier clutch coil relay or solenoid VC at line 83 is energized when the car receives a starting signal and thus the gear 44 of FIG. I is engaged with the clutch member 43.

The rotary acceleration switch RAC at line 110 of FIG. VI is utilized to start the acceleration of the car away from the floor. The rotary acceleration switch RAC is of the type of limit switch that has two windings. With one of said windings not energized the rotary acceleration switch rotates clothing a plurality of contacts sequentially until its limit is reached whereupon it opens a contact to disconnect that winding from the power supply and also to connect the other winding to the power supply. The rotary acceleration switch will then rotate in the opposite direction sequentially opening the plurality of contacts in an order reverse to that in which they were closed until its limit is again reached whereupon the second winding is disconnected from the power supply and the first winding is reconnected. In most applications, as in the present one, a number of other contacts are inserted in series with each of the windings of the limit switches to cause the operation of the rotary acceleration switch to be conditional. For example, in line 109 a series circuit through the brake relay contacts BK2, the advance motor stopping relay back contacts VR2, and the acceleration time relay back contacts AT must be completed before the winding 150 of the rotary acceleration switch RAC may be energized through its upper RAC limit switch. As hereinbefore described, the brake relay contacts BK2 are energized in the same sequence as when the car receives a start signal and therefore the BK2 contacts are closed in line 109 and the rotary acceleration switch rotates in a direction dependent upon the winding 150 and sequentially closes RAC contacts in lines 19, lines 18, lines 17, and line 112. At this time SRA and SRB relays are energized opening their contacts in lines 15, 16, 18, and 19. The sequential closing of the RAC contacts in lines 19, 18 and 17 removes the resistances 132, 131 and 130 from the generator shunt field circuit allowing more current to flow therethrough thereby accelerating the car away from the floor. The RAC contact in 112 closes to energize a rotary acceleration relay RAL. The energization of the rotary acceleration relay RAL closes its contacts in line 16 thereby also removing the resistor 129 from the generator shunt field circuit further accelerating the car. Contacts RAL close in line 23 to remove a portion of the resistance of rheostat 9 through the previously closed SRA contacts the operation of which will be described.

When the gate relay contacts G and the motor relay contacts M close at line 103, the rheostat relays RH and RHA and the deceleration rheostat relays SRA and SRB in lines 91 through 94 are energized through the advance motor stopping relay back contacts V at line 94 and the advance motor stopping relay back contacts VR1 at line 91. The energization of the deceleration relays SRA and SRB opens their back contacts at lines 15, 16, 18 and 19 thereby removing shorting circuit connections from around portions of the resistors 129 through 132. This places these portions of these resistors back in series with the generator shunt field 126 and allows the rotary acceleration switch RAC to sequentially remove these resistors from the generator circuit to accelerate the lifting motors. The deceleration relays SRA and SRB are utilized to provide a change in resistance pattern which allows a different deceleration from the acceleration as just described in utilizing the resistors 129 through 132. The sequence of operation of the deceleration relays SRA and SRB will be explained hereinafter.

The energization of the rheostat relays RH and RHA closes RH and RHA contacts in lines 24, 25 and 27. This closure of these contacts shorts portions of the resistance of the cam operated rheostat 9 to help provide acceleration for the car away from the floor. As will be explained hereinafter the RH and RHA contacts in lines 24, 25 and 27 short different portions of the resistance of the cam operated rheostat 9 than do the cams during the actual operation of the cam operated contacts associated with the rheostat 9 which operate in response to the movement of the shaft 28 in FIG. I. Again the RH and RHA contacts, when opening, will provide a change in resistance pattern to allow a different deceleration than the acceleration that is now being described.

As the car 1 starts to move away from the floor due to the acceleration of the lifting motor 6 the cam operators of the rheostat 9 start turning to sequentially operate the rheostat contacts R4 through R18 since, as described above, with the solenoid 50 activated in the clutch and gearing arrangement 40 the shafts 5, 15 and the output gear 25 are moving in a fixed relationship. The rheostat contacts R4(U) in line 101 are operated since the car is traveling in an up direction. The protective relay contacts LP1 which are normally open in line 100 are now closed as hereinbefore described, the up generator field relay contacts UF in line 96 are now closed, the normal motor field relay contacts MFN in line 95 are closed and the leveling acceleration relay back contacts LA are closed to provide a series circuit from the R4(U) contacts in line 101 so that the second slow down relay 2SD at line 95 is responsive to the closure of rheostat relay contacts RH3 in line 95. A similar circuit is readied for the closure of RH3 contacts in line 95 through the acceleration relays A and AA at lines 97 and 98 by the closure of the up generator field contacts UF at line 98.

The closure of the next cam operated rheostat contacts R5 at line 31 energizes the rheostat relay RH1 at line 33. The energization of relay RH1 closes its contacts RH1 at line 25 which further removes a portion of the resistance of the cam operated rheostat 9. The cam operated contacts R6 in line 31 now close energizing the rheostat relay RH2 thereby closing its contacts in line 25 to remove additional resistance from the cam operated rheostat 9. The cam operated contacts R7 in line 30 now close to energize rheostat relay RH3 at line 29. The closure of the contacts RH3 in line 95 thus energizes the second slowdown relay 2SD at line 95 and the acceleration relays A and AA at lines 97 and 98. The series of 2SD, A, and AA contacts in line 29 are now closed. The sequential closing of the cam operated contacts R8 through R15 further removes more resistance from the cam operated rheostat 9. The closure of contacts R11 in line 31 in the just described sequence energizes the high series field switch relay H at line 34 which closes the H contacts in line 20 and connects the high speed series field 116 in the loop circuit.

The closure of R16 at line 31 energizes the advance motor starting relay switch AMS at line 35. This opens the back contacts AMS in line 83 deenergizing the vernier clutch coil relay VC which is the solenoid 50 in the clutch and gearing arrangement 40. The cooperation of the retraction spring 70 in FIG. II and the retaining nut 73 on the bolt 71 disengages the gear 44 from the clutch face of the clutch member 43. The clutch and gearing arrangement 40 now no longer maintains a fixed relationship between the output gear 25 of the differential 17, the shaft 5 of the lifting motor 6, and the shaft 15 of the advance motor 16.

The energization of the advance motor starting relay AMS closes contacts in lines 105 and 106. The windings 152 and 153 of the advance motor at line 105 may now be energized through the closed protective relay contacts LP1, the previously closed up generator field contacts UF, and the closed rotary acceleration relay contacts RAL at line 104 and the closed gate relay G contacts and the motor relay M contacts at line 103. The advance motor at line 105 is a two-phase alternating-current motor employing a resistor-condenser circuit 154 connected between the two windings 152 and 153 so that both fields are energized whenever the motor is to run, the condenser furnishing the phase shift required between the current flowing in the two fields. Thus, when line current flows through the winding 152, the winding 153 carries quadrature current so that the motor rotates in the up-direction. When the winding 153 is energized directly through the down generator field contacts DF at line 106 the reverse occurs and the motor rotates in the opposite direction. The rotation of the advance motor 16 in FIG. I through its connection to the input shaft 15 of the differential gear carrier 22 rotates the rheostat assembly 9, illustrated in FIG. I and schematically illustrated in FIG. III, so as to progressively short out portions of the rheostat 9 resistance and thus increase the current flow in the generator field coils and thereby, through the action of the generator 113, increase the speed of the elevator drive motor 6.

As will be recalled from FIG. I, the advance motor 16 also drives the floor selector carriage or crosshead 10 as shown in FIG. I. A more detailed schematic view of the contacts on the crosshead and the stopping circuits is shown in FIG. VI, lines 105 to 109. A plurality of contacts 200 are connected in series between lines 105 and 109. A plurality of car signal contacts 210 are placed on the floor selector machine between lines 105 and 109. The car signal contacts in lines 105 and 109 are shown connected directly to the line. The contacts 210 in lines 106 through 108 are shown connected to the line through car signal contacts S4C, S3C, S2C, etc., which contacts are closed when there is a car call for the respective floors. Brushes 211 and 212 are carried on the crosshead 10 of the selector machine 8 and are connected through a normally open motor relay contact M. Contacts 213 and 214 are also carried on the crosshead 10 of the selector machine 8 in the spaced relationship as shown at line 106. As the crosshead 10 carries the contacts 211 and 212 in an upward direction on the selector machine 8, the car may be stopped when the brush 211 contacts an energized contact 210. Assume for the moment that the S4C contact is closed in line 106 in response to a car call for the fourth floor. When the crosshead 10 carries the brush 211 into engagement with the contact 210 at line 106 the stopping contacts 200 will be energized through the closed motor relay contact M at line 106. This will energize the advance motor stopping relay V at line 108 through the brush 213, the up generator field closed contact UF1 at line 107, the closed back contacts BRT of the advance motor stop relay and the closed rheostat relay contacts RH2 in line 108. The energization of the advance motor stop relay V energizes a stopping sequence for the car. Only a fragmentary portion of the contacts on the selector machine for initiating the stopping sequence are shown. Other standard circuits for this purpose may be used.

The back contact of the advance motor stopping relay V in line 94 is opened deenergizing the rheostat relays RH and RHA and the deceleration relays SRA and SRB. Therefore, the RH and RHA contacts in lines 24, 25 and 27 open inserting resistance into the rheostat 9 causing the car to decelerate. The condenser 170 connected across the RH contacts in line 24 of FIG. III functions as an arc suppressor for any arcing caused by the opening of the rheostat relays RH and RHA contacts. The deenergization of the deceleration relays SRA and SRB allows the back contacts in lines 15, 16, 18 and 19 to close shorting a portion of the resistances 129, 130, 131 and 132 which, as described hereinbefore, allows a different deceleration resistance pattern from that followed while accelerating.

The advance motor stopping relay contacts V in line 61 are now closed energizing the advance motor stopping relay VR in line 60. The energization of the advance motor stopping relay VR closes contacts VR in line 60 to complete a seal-in circuit through the closed brake relay contacts BK2, opens back contacts VR in line 25 to insert additional decelerating resistance in the rheostat 9, closes front contacts VR in line 63 to energize advance motor stopping relays VR1 and VR2 in lines 62 and 63, and closes VR front contacts in lines 106 and 107 to shunt the advance motor switch relay contacts AMS.

The energization of the advance motor stopping relay VR1 closes contacts VR1 in line 61 to energize the advance motor stopping relay VR2, opens back contacts VR1 in line 56 to disconnect part of the circuit for energizing the leveling speed motor field relay MFL, and opens back contacts VR1 in line 66 to deenergize limit relay L. The energization of the advance motor stopping relay VRT opens back contacts VRT in line 103 deenergizing the advance motor auxiliary relays AMR and AMR1 and opens back contacts VRT in line 108 to deenergize the advance motor stopping relay V.

The energization of the advance motor stopping relay VR2 opens back contacts in line 109 and closes front contacts in line 111 to complete the circuit to the rotary acceleration switch RAC in line 110 so that the rotary acceleration switch RAC may start rotating and sequentially open the RAC contacts at lines 112, 17, 18 and 19, respectively. The opening of the RAC contacts at line 112 deenergizes the rotary acceleration relay RAL in line 112 and opens its contacts in line 16 to insert the entire resistance of the resistor 129 into the generator field circuit. The opening of the RAC contacts in 17, 18 and 19 sequentially inserts all of the resistors 130, 131 and 132 into the generator field circuit. As was hereinbefore discussed, deceleration relay contacts SRA and SRB in lines 15, 16, 18 and 19 are now closed thus providing the generator field circuit with a different resistance pattern for deceleration than for acceleration by shorting portions of the resistor 129 to 132.

The RAL contacts open in line 23 to further insert more resistance in the rheostat 9 if the deceleration relay contacts SRA in the same line have not already operated to open the circuit.

RAL contacts open in line 104 disconnecting the advance motor at line 105 from its primary circuit through the gate relay G contacts and the motor relay M contacts at line 103. The advance motor is now energized from the brush 213 which is energized from a stopping contact 200 through a closed car call signal button, for example, S4C at line 106. The circuit from the brush 213 may be traced through the now closed back contact AMR1 at line 105 through the protective relay LP1 contacts at line 104, the winding 152 of the advance motor and the now closed VR contacts at line 106. The advance motor turns until the crosshead moves the brush 213 past the energized contact 200. If for any reason the crosshead or the advance motor shaft starts to creep away from the position illustrated in FIG. VI where the spaced contacts 213 and 214 straddle the stopping contact 200 in line 106 the advance motor will be energized either through the brush 213, as described, or through the brush 214 to drive the advance motor and thus the crosshead back to straddling position. The circuit from the brush 214 may be traced through the now closed advance motor auxiliary relay back contacts AMR1 in line 108, through the protective relay contacts LP1 at line 106, the advance motor stopping relay contacts VR at line 107, the winding 153, and the closed advance motor stopping relay contacts VR at line 106. Thus, if the brush 214 touches the stopping contact 200 in line 106 the advance motor is energized to drive the crosshead in a downward direction, again establishing the straddling position of the spaced contacts 213 and 214 about the contact 200 in line 106.

Since the advance motor has now stopped and the lifting motor 6 is traveling at full speed, the cam operated contacts R4 through R18 in the rheostat 9 will begin to open in the reverse order to decelerate the lifting motor 6. The contacts R18 and R17 in line 30 open inserting resistance into the generator field circuit. The contact R16 in line 31 opens deenergizing the advance motor switch relay AMS in line 35. The deenergization of the advance motor stopping relay AMS opens its contacts AMS in line 30 to insert further resistance in the generator field circuit, closes back contacts AMS in line 83 to ready the vernier clutch coil VC for energization on the next start away from the floor, and opens contacts AMS in lines 105 and 106 to further disconnect the advance motor at line 105 from the power circuit leaving the advance motor dependent upon the closed advance motor stopping relay contacts VR at lines 106 and 107 for energization to keep the contacts 213 and 214 in the previously discussed straddling position.

The cam operated contacts R15 through R12 open inserting additional resistance into the generator field circuit. The contact R11 in line 31 opens to deenergize the high series field switch relay H in line 34. Contacts H then open in line 20 to disconnect the high speed series field 116 and back contacts H close in line 56 to ready the leveling speed motor field relay MFL circuit for energization.

Cam operated contacts R10 through R8 open to insert further resistance into the generator field circuit. The cam operated contact R7 in line 30 opens to deenergize the rheostat relay RH3. The deenergization of the rheostat relay RH3 opens contacts in line 95 to deenergize the second slow down relay 2SD and the acceleration relays A and AA in lines 95, 98 and 99. The deenergization of the second slow down relay 2SD and the acceleration relays A and AA causes the contacts 2SD, A and AA to open in line 29 and the A contact to open in line 24 which inserts further resistance into the generator field circuit.

The opening of the cam operated contacts R6 and R5 deenergizes the rheostat relay contacts RH2 and RH1 in lines 32 and 33. The deenergization of the RH2 relay opens front contacts in line 25 to insert further resistance into the generator field circuit and opens front contacts in line 108 to further disconnect the circuit for energizing the advance motor stop relay V. The deenergization of the rheostat relay RH1 opens front contacts RH1 in line 25 to insert additional resistance in the generator field, closes back contacts RH1 in lines 51 and 52 to provide power for the protective relays LP1 and LP2 which are presently receiving energization through a closed WT contact at line 50. However, rheostat sequence relay WT has its seal-in circuit in line 72 broken by the opening of the rheostat relay contact RH1. The closure of the back contacts RH1 at line 52 is an anticipation of the opening of the now closed brake relay BK2 contacts in line 52 through which power is now supplied to the brake relay, up generator field relay, down generator field relays, and emergency relay circuits in the upper portion of FIG. IV.

The entire resistance of the rheostat 9 is now inserted into the generator field circuit except the portion controlled by the leveling relay contacts LU, LD, 2LU, 2LD, LUA and LDA in lines 21 through 29.

As the elevator is approaching the selected floor, the leveling switches, through circuits not illustrated, take over the control of the elevator drive motor 6 so as to accurately level the car with the floor. In the event that slippage of the cable has occurred so that the rheostat assembly 9 does not return exactly to center position, one or the other of the cam activated contacts 30 or 31 shown symbolically in FIG. I remains closed and the correction motor 32 is energized so that the differential input shaft 20 is driven by the correction motor and the clutch 21 is slipped until the opening of the closed one of the contacts 30 or 31 indicates that the rheostat has been returned to its center position.

The correction motor circuit is illustrated in detail in FIG. VI at lines 99 through 101. The correction motor at line 100 is preferably a two-phase motor having windings 156 and 157 and includes a condenser-resistor circuit 158 to supply the quadrature current to that one of the fields 156, or 157 not directly energized. The correcting motor is energized through normally open leveling contacts 2LU and 2LD and through the back contacts BK of the brake relay. Since the 2LU and 2LD contacts are normally open and the brake contact BK is normally closed, the correction motor can be operated only when the elevator motor 6 is stopped, the brakes are set, and the leveling control through the 2LU and 2LD contacts indicates that the car is level with the floor. The direction of rotation of the correction motor is determined by which one of the R4(U) up or R4(D) down contacts are activated by cams in the cam operated rheostat 9. The inclusion of the brake relay BK contact in line 99 prevents the flow of circulating currents through the windings 156, 157 and the resistor condenser 158 when the correction motor is not energized. Further details of the operation of the correction motor and advance motor are set forth in U.S. Patent No. 2,685,348, issued August 3, 1954, entitled "Elevator Control System," by Joseph H. Borden. Details on leveling controls for an elevator system as illustrated may be found in U.S. Patent No. 2,873,819, issued February 17, 1959, entitled "Elevator Leveling Controls," by Joseph H. Borden.

The above description of the operation of the illustrated elevator system assumed that the distance to be traveled by the elevator car was sufficient to take the operation of the motor control up to the point where the advance motor at line 105 was utilized. Although the cooperation of the circuits and apparatus is novel and useful, as shown and described above, the operation of the system in obtaining the greatest floor to floor speed on short runs of one floor, two floors and possibly three floors without the use of the advance motor is an even more important concept. It is to be noted that through the cooperation of the clutch and gearing means 40 and the rotary acceleration switch RAC that the car may be accelerated on the hereinbefore described theoretical curve for slightly less than half of a short run and decelerate for the remainder of the time. Throughout the acceleration of the car whether by the rotary acceleration switch and its cooperating contacts, the rheostat relays and their cooperating relay contacts, and/or the cam operated rheostat 9, if the crosshead on the selector machine picks up a signal to stop, the stopping sequence is initiated immediately independently of the acceleration circuits.

Thus it may be seen that an elevator system has been provided which comprises an elevator car serving a plurality of floors and an elevator motor for driving said car. A floor selector mechanism is provided which is adapted to initiate a stopping sequence for the car and to provide other signals utilized by the system. An advance motor drives the floor selector mechanism. A car speed control means, which may be a mechanically operated (e.g. cam operated) rheostat, and means to initiate movement of the car away from the floor are provided. The movement initiating means may comprise a rotary acceleration switch which sequentially removes resistance from a circuit of the car speed control means in response to a car starting signal. A differential means operatively compares the speeds of the advance motor and the elevator motor and adjusts the car speed control means in response to the differences thereof. Selective means, including a clutch and gearing arrangement, connects the elevator motor to drive the floor selector mechanism. The selective means is responsive to a car start signal, the initiation of a stopping sequence, and to a deenergized condition of the advance motor. The selective means as shown in the illustrated embodiment utilizes a clutch and gearing arrangement which is operative to fix the rotational relationship of the elevator motor means and the advance motor means while the advance motor is deenergized. Therefore, the car speed control means (the cam operated rheostat) is adjusted by the fixed relationship of the differential while the advance motor is deenergized. The car speed control means is further operative to decelerate the selective means and to energize the advance motor in response to a predetermined speed of the car.

Through the foregoing apparatus and operatively functional means the elevator system illustrated herein provides a greater floor to floor speed by utilizing the apparatus already normally needed for an elevator system, with few additional components.

In conclusion it is pointed out that while the illustrated example constitutes a practical embodiment of my invention, I do not limit myself to the exact details shown, since modification of the same may be varied without departing from the spirit of this invention.

Having described the invention, I claim:

1. In an elevator control, in combination; an elevator car serving a plurality of floors; an elevator motor adapted to drive said car; motor control means for accelerating said car; means for detecting the normal uniform velocity of said car; means for detecting a predetermined ratio of the distance traveled by said car from its last stop to the total distance to be traveled; said motor control means being operative to interrupt said acceleration in response to the detection of said predetermined ratio or the detection of normal uniform velocity, whichever occurs first.

2. In an elevator control, in combination; an elevator car serving a plurality of floors; an elevator motor adapted to drive said car; motor control means for accelerating said car; means for detecting the normal uniform velocity of said car comprising a differential having two inputs operatively coupling said elevator motor and an advance motor; an output of said differential being operative to change the resistance of a rheostat to which said motor control means is responsive; means for detecting a predetermined ratio of the distance traveled by said car from its last stop to the total distance to be traveled; said motor control means being operative to interrupt said acceleration in response to the detection of said predetermined ratio or to the detection of normal uniform velocity, whichever occurs first.

3. In an elevator control, in combination; an elevator car serving a plurality of floors; an elevator motor adapted to drive said car; motor control means for accelerating said car; means for detecting the normal uniform velocity of said car comprising a differential having two inputs coupling said elevator motor and an advance motor; an output of said differential being operative to change the resistance of a rheostat to which said motor control means is responsive; means for detecting a predetermined ratio of the distance traveled by said car from its last stop to the total distance to be traveled comprising means fixing the relationship of said output with one of said inputs of said differential for a predetermined interval after said car has moved away from a floor and means for detecting a stop signal for said car; said motor control means being operative to interrupt said acceleration in response to the detection of said predetermined ratio or the detection of normal uniform velocity, whichever occurs first.

4. In an elevator control system, in combination, an elevator car serving a plurality of floors; elevator driving means driving said car; control means for said driving means including first means to initiate movement of the car away from a floor and movement responsive means responsive only to car movement for accelerating said car after said car is moving away from said floor.

5. In an elevator control system, in combination, an elevator car serving a plurality of floors; elevator driving means driving said car; driving control means including means to initiate movement of the car away from a floor and means responsive to car movement accelerating said car after said car is moving away from said floor; said means initiating movement of said car away from a floor including a rotary acceleration switch which sequentially accelerates said elevator driving means in response to a predetermined car starting signal.

6. In an elevator control system, in combination, an elevator car serving a plurality of floors; elevator driving means driving said car; driving control means including means to initiate movement of the car away from a floor and means responsive to car movement accelerating said car after said car is moving away from said floor; said means responsive to car movement comprising mechanical rheostat means controlling the energy applied to said elevator driving means and means coupling said elevator driving means to said mechanical rheostat means.

7. In an elevator control, in combination; an elevator car that serves a plurality of floors, an electric elevator motor for driving said car; motor control means including first means for initiating movement of the car away from a floor and second means directly responsive to car speed for accelerating said car after said car initially moves away from said floor; said second means comprising a mechanically operated rheostat controlling the energy applied to said elevator motor.

8. In an elevator control, in combination; an elevator car that serves a plurality of floors, an electric elevator motor for driving said car; motor control means including means for initiating movement of the car away from a floor and means directly responsive to car speed for accelerating said car after said car initially moves away from said floor; said accelerating means comprising a mechanically operated rheostat controlling the current applied to said elevator motor; floor selecting means adapted to initiate a stopping sequence for said car; an advance motor adapted to drive said floor selecting means; said advance motor and said elevator motor being respectively operatively coupled to two inputs of a differential means; an output of said differential means being coupled to said mechanically operated rheostat; and means fixing the relationship between two of the two input and the output means of said differential.

9. In an elevator control, in combination; an elevator car that serves a plurality of floors, an electric elevator motor for driving said car; motor control means including means for initiating movement of the car away from a floor and means directly responsive to car speed for accelerating said car after said car initially moves away from said floor; said accelerating means comprising a mechanically operated rheostat controlling the energy applied to said elevator motor; floor selecting means adapted to initiate a stopping sequence for said car, an advance motor adapted to drive said floor selecting means; said advance motor and said elevator motor being respectively operatively coupled to two inputs of a differential mechanism; an output of said differential being coupled to said mechanically operated rheostat; and means fixing the relationship between two of the two input and the output means of said differential; said relation fixing means being responsive to car start signals and to the initiation of said stopping sequence.

10. In an elevator control, in combination; an elevator car that serves a plurality of floors, an electric elevator motor for driving said car; motor control means including means for initiating movement of the car away from a floor and means directly responsive to car speed for accelerating said car after said car initially moves away from said floor; said accelerating means comprising a mechanically operated rheostat controlling the energy applied to said elevator motor; floor selecting means adapted to initiate a stopping sequence for said car; an advance motor adapted to drive said floor selecting means; said advance motor and said elevator motor being respectively operatively coupled to two inputs of said differential; an output of said differential being coupled to said mechanically operated rheostat; and means fixing the relationship between two of the two input and the output means of said differential; said relation fixing means being responsive to car start signals and to the initiation of said stopping sequence; said advance motor being responsive to the deenergization of said relation fixing means and to the initiation of said stopping sequence.

11. An elevator system comprising a car serving a plurality of landings; a motor driving said car; means for initiating movement of said car away from a floor; floor selecting means including a crosshead carriage adapted to initiate a stopping sequence for said car; means operatively coupling said motor to drive said crosshead of said floor selector means.

12. An elevator system comprising a car serving a plurality of landings; a motor driving said car; means for initiating movement of said car away from a floor, floor selecting means adapted to initiate a stopping sequence for said car; means selectively coupling said motor alone to drive said floor selector means only during an acceleration period.

13. An elevator system comprising a car serving a plurality of landings; a motor driving said car; means for initiating movement of said car away from a floor, floor selecting means including a crosshead carriage adapted to initiate a stopping sequence for said car; means operatively coupling said motor to drive said crosshead of said floor selector means; said coupling means being responsive to car start signals and to said initiation of a stopping sequence.

14. An elevator system comprising a car adapted to serve a plurality of floors; an elevator motor driving said car; a floor selecting mechanism having a crosshead carriage; an advance motor adapted to drive said crosshead carriage; differential means coupling the outputs of said elevator motor and said advance motor; rheostat means controlling said elevator motor operatively connected to an output of said differential; and means selectively connecting said elevator motor to drive said crosshead carriage.

15. An elevator system comprising a car adapted to serve a plurality of floors; an elevator motor driving said car; a floor selecting mechanism having a crosshead carriage; an advance motor adapted to drive said crosshead carriage; differential means coupling the outputs of said elevator motor and said advance motor; rheostat means controlling said elevator motor operatively connected to an output of said differential; and means selectively connecting said elevator motor to drive said crosshead carriage; said selective means being responsive to a deenergized condition of said advance motor.

16. An elevator system comprising a car adapted to serve a plurality of floors; an elevator motor driving said car; a floor selecting mechanism having a crosshead carriage; an advance motor adapted to drive said crosshead carriage; differential means coupling the outputs of said elevator motor and said advance motor; rheostat means controlling said elevator motor operatively connected to an output of said differential; and means selectively connecting said elevator motor to drive said crosshead carriage; said selective means being responsive to a deenergized condition of said advance motor, to a car start signal, and to the initiation of a stopping sequence for said car.

17. An elevator system comprising an elevator car serving a plurality of floors; an elevator motor driving said car; a floor selector mechanism; advance motor means for driving said floor selector mechanism; a car speed control means; means operatively comparing the speeds of said advance motor and said elevator motor and adjusting said car speed control means in response thereto; and means selectively connecting said elevator motor to drive said floor selector mechanism.

18. An elevator system comprising an elevator car serving a plurality of floors; an elevator motor driving said car; a floor selector mechanism; advance motor means for driving said floor selector mechanism; a car speed control means; means operatively comparing the speeds of said advance motor and said elevator motor and adjusting said car speed control means in response thereto; and means selectively connecting said elevator motor to drive said floor selector mechanism; said selective means comprising a clutch and gearing arrangement operative to fix the rotational relationship of said elevator motor means and said advance motor means while said advance motor is deenergized.

19. An elevator system comprising an elevator car serving a plurality of floors; an elevator motor driving said car; a floor selector mechanism; advance motor means for driving said floor selector mechanism; a car speed control means; means operatively comparing the speeds of said advance motor and said elevator motor and adjusting said car speed control means in response thereto; and means selectively connecting said elevator motor to drive said floor selector mechanism; said selective means comprising a clutch and gearing arrangement operative to fix the rotational relationship of said elevator motor means and said advance motor means while said advance motor is deenergized; said selective means being responsive to a car start signal.

20. An elevator system comprising an elevator car serving a plurality of floors; an elevator motor driving said car; a floor selector mechanism adapted to initiate a stopping sequence for said car; advance motor means for driving said floor selector mechanism; a car speed control means; means operatively comparing the speeds of said advance motor and said elevator motor and adjusting said car speed control means in response thereto; and means selectively connecting said elevator motor to drive said floor selector mechanism; said selective means comprising a clutch and gearing arrangement operative to fix the rotational relationship of said elevator motor means and said advance motor means while said advance motor is deenergized; said selective means being responsive to a car start signal and the initiation of said stopping sequence.

21. An elevator system comprising an elevator car serving a plurality of floors; an elevator motor driving said car; a floor selector mechanism; advance motor means for driving said floor selector mechanism; a car speed control means; means to initiate movement of the car away from a floor; means operatively comparing the speeds of said advance motor and said elevator motor and adjusting said car speed control means in response thereto; and means selectively connecting said elevator motor to drive said floor selector mechanism.

22. An elevator system comprising an elevator car serving a plurality of floors; an elevator motor driving said car; a floor selector mechanism; advance motor means for driving said floor selector mechanism; a car speed control means; means to initiate movement of the car away from the floor comprising rotary acceleration switch means for sequentially removing resistance from a circuit of said car speed control means; means operatively comparing the speeds of said advance motor and said elevator motor and adjusting said car speed control means in response thereto; and means selectively connecting said elevator motor to drive said floor selector mechanism.

23. An elevator system comprising an elevator car serving a plurality of floors; an elevator motor driving said car; a floor selector mechanism adapted to initiate a stopping sequence for said car; advance motor means for driving said floor selector mechanism; a car speed control means; means to initiate movement of the car away from a floor; means operatively comparing the speeds of said advance motor and said elevator motor and adjusting said car speed control means in response thereto; and means selectively connecting said elevator motor to drive said floor selector mechanism; said selective means comprising a clutch and gearing arrangement operative to fix the rotational relationship of said elevator motor means and said advance motor means while said advance motor is deenergized; said selective means being responsive to a car start signal and the initiation of said stopping sequence.

24. An elevator system comprising an elevator car serving a plurality of floors; an elevator motor driving said car; a floor selector mechanism adapted to initiate a stopping sequence for said car; advance motor means for driving said floor selector mechanism; a car speed control means; means to initiate movement of the car away from a floor comprising rotary acceleration switch means for sequentially removing resistance from a circuit of said car speed control means in response to a car starting signal; means operatively comparing the speeds of said advance motor and said elevator motor and adjusting said car speed control means in response thereto; and means selectively connecting said elevator motor to drive said floor selector mechanism; said selective means comprising a clutch and gearing arrangement operative to fix the rotational relationship of said elevator motor means and said advance motor means while said advance motor is deenergized; said selective means being responsive to a car start signal and the initiation of said stopping sequence.

25. An elevator system comprising an elevator car serving a plurality of floors; an elevator motor driving said car; a floor selector mechanism adapted to initiate a stopping sequence for said car; advance motor means for driving said floor selector mechanism; a car speed control means; means to initiate movement of the car away from a floor comprising rotary acceleration switch means for sequentially removing resistance from a circuit of said car speed control means in response to a car starting signal; means operatively comparing the speeds of said advance motor and said elevator motor and adjusting said car speed control means in response thereto; and means selectively connecting said elevator motor to drive said floor selector mechanism; said selective means comprising a clutch and gearing arrangement operative to fix the rotational relationship of said elevator motor means and said advance motor means while said advance motor is deenergized; said selective means being responsive to a car start signal and the initiation of said stopping sequence; said car speed control means being operative to deactivate said selective means and to energize said advance motor in response to a predetermined speed of said car.

26. In an elevator system, in combination; an elevator car serving a plurality of floors; means for initiating the movement of said car away from a floor; means effective during acceleration for measuring the distance from or to the floor at which a car left or is approaching; means for regulating the speed of a car according to said distance, and means effective during acceleration for detecting the presence of stop calls within a multiple of said distance for interrupting said acceleration.

27. In an elevator control, in combination; an elevator car serving a plurality of floors; an elevator motor adapted to drive said car; motor control means for accelerating said car; means for detecting the excitation level necessary to drive said motor and said car at a normal uniform velocity; means for detecting a predetermined ratio of the distance traveled by said car from its last stop to the total distance to be traveled; said motor control means being operative to interrupt said acceleration in response to the detection of said predetermined ratio or the detection of said excitation level.

28. In an elevator control, in combination; an elevator car serving a plurality of floors; driving means adapted to drive said car; control means for said driving means including means for initiating movement of said car away from a floor and means for accelerating said car in direct proportion to the rate of movement of said car.

References Cited in the file of this patent
UNITED STATES PATENTS

| | | |
|---|---|---|
| 1,882,958 | Santini | Oct. 18, 1932 |
| 1,943,114 | Eaton | Jan. 9, 1934 |
| 2,466,364 | Boon | Apr. 5, 1949 |
| 2,643,741 | Esselman | June 30, 1953 |